Aug. 14, 1956  R. S. DICKERT ET AL  2,758,609
CHECK VALVE
Filed May 6, 1953
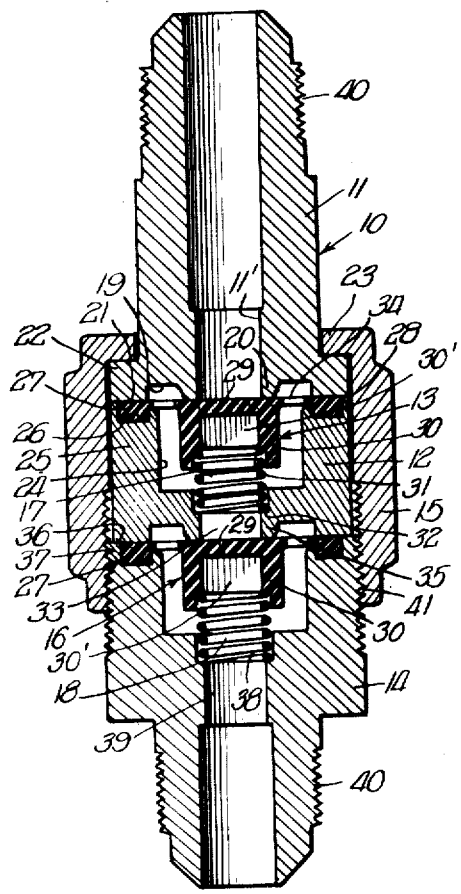
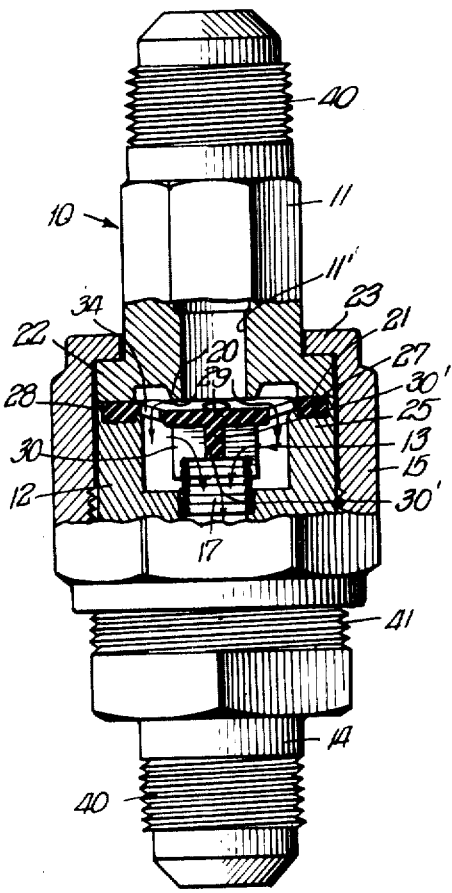
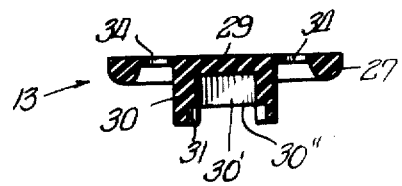
INVENTORS
Robert S. Dickert,
BY Evan Jones

United States Patent Office 2,758,609
Patented Aug. 14, 1956

2,758,609

CHECK VALVE

Robert S. Dickert, Chicago, and Evan Jones, Evanston, Ill., assignors to Henry Flow Control Company, Melrose Park, Ill., a corporation of Illinois Application May 6, 1953, Serial No. 353,310

13 Claims. (Cl. 137—525)

The present invention relates to improvements in a check valve of the diaphragm type which, though well suited to effect one-way control of a fluid in any system, is particularly devised for use in an installation handling two different fluids such as air and water. In an illustrative installation, a simple version of the valve may be employed as a component of a liquid level indicator device, by which compressed air is admitted to the interior of a tank to enable an air instrument of the device to determine the tank level. The valve in this instance admits the flow of compressed air while preventing reverse flow of liquid to the air pressure source.

It is an object of the invention to provide a very simple and inexpensive check valve, which can be constructed as a single stage or dual stage diaphragm unit, being characterized in either case by a flexible, non-metallic, spring urged diaphragm of molded synthetic rubber or other rubber-like material, this diaphragm providing a central, spring seating portion at its rear which is of thick, block-like character, a central valve seat disk portion forwardly thereof, an integral external O-ring portion which is controlledly compressed between a pair of coacting tubular members or fittings of the valve, and an intermediate radial, web-like diaphragm portion between the central and O-ring portions, the web portion having openings for the axial, one-way flow of fluid radially outwardly of the seat disk portion. However, the seat disk portion back-seats against a fitting bore at its area located radially inwardly of those openings to prevent reverse flow.

A more specific object of the invention is to provide a check valve comprising a pair of axially aligned and clamped tubular fittings, one of which has an annular, rim-like seat surrounding the bore thereof, against which a flexible diaphragm as described above engages or back-seats to prevent reverse flow, the fittings being interengaged in a manner to compress an O-ring portion of the diaphragm with a controlled squeeze between rigid axially engaging surfaces of the respective fittings, there being an annular groove surrounding the diaphragm-engaged back-seat and this groove being exposed to the web openings in the diaphragm for the one-way flow of liquid through the diaphragm when the latter is pressure-actuated away from the annular rim-like seat.

Yet another object of the invention is to provide as an improved article of manufacture, a simple, one-piece flexible or resilient, non-metallic diaphragm which features a central, relatively rigid and block-like portion projecting rearwardly of a forward valve seating surface, this portion having a central recess at its rear which is counter-bored to serve as a coil spring-engaging, forward thrust transmitting shoulder or member, the diaphragm also having an annular outer O-ring portion which is substantially reshaped under compression and an apertured flexible web portion integrally connecting the seat disk and O-ring portions. The rearwardly projecting recessed portion is radially pivoted for the flow of fluid radially into the same and thence axially through the coils of the spring.

The foregoing statements are indicative in a general way of the nature of the invention. Other and more specific objects will be apparent to those skilled in the art upon a full understanding of the construction and operation of the improved check valve and its components.

A single embodiment of the invention is presented for purpose of illustration. It will be appreciated that the invention may be incorporated in other modified forms coming equally within the scope of the appended claims.

In the drawings:

Fig. 1 is a view in axial section through a check valve in accordance with the invention, the parts being shown in a sealing position in which undesired reverse flow is prevented;

Fig. 2 is a view, partially broken away and in axial section generally corresponding to Fig. 1, but rotated 90°, showing the improved valve in an unseated position of its diaphragm element to permit fluid flow as indicated by the arrows; and Fig. 3 is a view in axial section through the improved flexible diaphragm provided by the invention, showing the member in a free, axially uncompressed condition.

Figs. 1 and 2 illustrate the improved check valve in a two-stage embodiment embodying two flexible non-metallic diaphragms, with corresponding diaphragm disk springs and associated valve seat provisions. This unit is designed for general, one way fluid-flow control, check valve operation; it may, if desired, be produced as a single stage unit. In such an adaptation the valve is particularly well suited for use as an adjunct of a liquid level indicator device of the sort described above. Such device involves a compressed air source pressurizing a tank interior so as to enable an instrument to determine the level of liquid in a liquid storage tank or other receptacle. Reverse flow from the tank to the compressed air is obviously to be avoided.

The check valve is generally designated 10. In general it comprises a hollow tubular intake nipple or fitting 11, a rigid tubular or sleeve-like spacer 12 disposed coaxially therebeneath, the nipple and spacer clamping a primary flexible non-metallic diaphragm member 13 therebetween, a tubular outlet fitting 14 and an external sleeve or union 15 by which the above parts are clamped in assembled relation. Outlet fitting 14 and spacer 12 clamp a secondary diaphragm 16 therebetween, the relationship of parts being the same as that of spacer 12 and intake fitting 11 to the diaphragm 13. Coil compression springs 17, 18 urge the respective diaphragms 13, 16 against intake fitting 11 and spacer 12, respectively. The diaphragms are one-piece members molded of synthetic rubber or equivalent elastic, rubber-like material.

A lower flat sealing face of intake fitting 11 is machined concentrically of its bore 11' to provide an annular groove 19 which externally defines a rim-like valve seat or rib 20 against which diaphragm 13 back-seats. Externally of groove 19, fitting 11 presents a flat, annular, outer face 21 against which diaphragm 13 is peripherally clamped, in a manner to be described. The fitting is also flanged radially outwardly above this face to provide an outer shoulder 22; an inwardly flanged annular rim 23 on coupling union 15 engages behind this shoulder to compress the parts.

Intermediate spacer 12 is provided with a cylindrical internal, upwardly opening cavity 24 of substantial diameter, which is surrounded by an axially extending wall 25. The forward or top face of this wall is annularly grooved at 26 for the reception of an external, integral O-ring portion 27 of diaphragm 13 (see Fig. 3). Groove 26 is located so as to leave an outer, axially projecting annular rim 28; this rim is adapted to have axially abutting engagement with the face 21 of intake fitting 11 when the parts are fully taken up, as illustrated in Figs. 1 and 2, thereby limiting the compression of the O-ring diaphragm portion 27, compared to its free, uncompressed condition shown in Fig. 3.

The center of the diaphragm 13 is formed to provide a forward, disk-like, radial seating wall 29 and an integral rearwardly extending annular wall 30 at a right angle thereto. It is shaped at its rear extremity to provide an internal valve seating ledge or counterbore 31 against which coil spring 17 forwardly abuts. The rear of this spring is sustained by a counterbored ledge 32 formed in the central bore 33 of the spacer 12.

Wall 30 is diametrically spanned internally by a connecting web 30' extending flush with ledge 31, and is provided with passages 30" at 90° to this web through which fluid may flow to the interior of spring 17 when diaphragm seat 29 unseats.

An annular series of one-way flow passages 34 is formed in the radial web portion of the diaphragm 13 which integrally connects its O-ring portion 27 and its central, forward valve seating portion 29, this series of openings being located radially outwardly of the disk-like wall portion. Accordingly, when diaphragm 13 is normally urged upwardly by spring 17 in the absence of an overruling downward fluid pressure, as illustrated in Fig. 1, the disk portion 29 seals against the fitting seat 20, preventing reverse flow of liquid in an upward direction as viewed in Fig. 1. However the disk may be urged downwardly under fluid pressure above diaphragm 13, as illustrated in Fig. 2, unseating the same from seat 20 and permitting downward flow of fluid, gaseous or otherwise, as indicated by arrows in Fig. 2, the spring 17 compressing under this force, and the fluid passing through ports or passages 30" to its interior.

Diaphragm clamping and seating provisions on the opposite side of spacer 12 and on discharge fitting 14, for coaction with diaphragm 16, are very similar, in fact almost identical to those described above. A downwardly projecting diaphragm sealing seat 35, like seat 20, is formed in surrounding relation to the spacer bore 33. The flat lower face 36 of the spacer, in operative position, abuts an annular rim or outer shoulder 37 on the upper area of discharge fitting 14. This shoulder surrounds the annular groove in that area in which the outer O-ring sealing portion of diaphragm 16 is disposed. Because diaphragms 13, 16 are identical, corresponding reference numerals designate corresponding parts or relationships thereof, and further description will be dispensed with.

Coil spring 18 abuts and axially urges the diaphragm 16 in the manner described in connection with spring 17 and diaphragm 13. It is rearwardly sustained by a counterbored ledge 38 in the bore 39 of discharge fitting 14. The fittings 11, 14 are provided with threaded nipples 40 for connection in the fluid line, and threads 41 on fitting 14 and union 15 provide the means to couple all the above parts in operative condition.

The operation of the check valve is no doubt clear from the foregoing description. The structure and functioning of diaphragm 16 are the same as diaphragm 13. Details of these diaphragms, in a relaxed or free, uncompressed condition thereof, are illustrated in Fig. 3, from which it is seen by reference to the other figures that the O-ring portion 27, under the compression exerted thereon, is caused to flow and fill the space of the groove in which it is disposed. However undue compression, such as to cause excessive extrusion and damage of the diaphragm, is prevented by a positive, metal-to-metal engagement of the respective outwardly projecting shoulders 28, 37 with the opposed, lower annular flat faces 21, 36, respectively, of intake fitting 11 and spacer 12.

The diaphragm affords a relatively rigid, block-like central rear seat for the compression spring at its rearwardly projecting wall 30, an efficient disk-like seating or sealing member at its forward, upwardly exposed wall 29, along with flow passages 34 outwardly of this disk which are of substantial fluid handling capacity. The valve is simple in its parts and well suited for mass production machining operation. Its assembly is also very simply performed, without possibility of mis-mating of parts. When assembled, the unit is sensitive and efficient in operation.

We claim:

1. A check valve comprising a tubular intake member having an axial bore surrounded by an annular end face portion and an axially opening valve seat located radially inwardly of said portion, a further tubular member having an axial bore aligned with said intake member bore and an annular end face portion in axially opposing relation to the face portion of said intake member, a flexible diaphragm disposed between said members in transverse relation to said bores thereof, said diaphragm comprising an outer compressible O-ring seal element disposed between said end face portions, a central, imperforate disk-like valve seat element axially aligned with said intake member valve seat and of a size sufficient to seal the latter upon axial engagement therewith, and an intermediate portion integrally connecting said seal and seat elements, said intermediate portion being apertured in the annular zone thereof between said elements, said central element having an integral, hollow rear extension affording a flow passage for fluid traversing said apertured intermediate portion, and means securing said members in axial alignment to engage the end face portions thereof, one of said end face portions being relieved to provide an annular groove receiving said O-ring seal element for partial compression by the other end face portion, as determined by the engagement of said end face portions.

2. A check valve comprising a tubular intake member having an axial bore surrounded by an annular end face portion and an axially opening valve seat located radially inwardly of said portion, a further tubular member having an axial bore aligned with said intake member bore and an annular end face portion in axially opposing relation to the face portion of said intake member, a flexible diaphragm disposed between said members in transverse relation to said bores thereof, said diaphragm comprising an outer compressible O-ring seal element disposed between said end face portions, a central, imperforate disk-like valve seat element axially aligned with said intake member valve seat and of a size sufficient to seal the latter upon axial engagement therewith, and an intermediate portion integrally connecting said seal and seat elements, said intermediate portion being apertured in the annular zone thereof between said elements, said central element having an integral, hollow rear extension affording a flow passage for fluid traversing said apertured intermediate portion, said diaphragm being resiliently biased for engagement of said seat element with said seat, and means securing said members in axial alignment to engage the end face portions thereof, one of said end face portions being relieved to provide an annular groove receiving said O-ring seal element for partial compression by the other end face portion, as determined by the engagement of said end face portions.

3. A check valve comprising a tubular intake member having an axial bore surrounded by an annular end face portion and an axially opening valve seat located radially inwardly of said portion, a further tubular discharge member having an axial bore aligned with said intake member bore and an annular end face portion in axially opposing relation to the face portion of said intake member, a flexible diaphragm disposed between said members in transverse relation to said bores thereof, said diaphragm comprising an outer compressible O-ring seal element disposed between said end face portions, a central, imperforate disk-like valve seat element axially aligned with said intake member valve seat and of a size sufficient to seal the latter upon axial engagement therewith, and an intermediate portion integrally connecting said seal and seat elements, said intermediate portion being apertured in the annular zone thereof between said elements, said central element having an integral, hollow rear extension affording a flow passage for fluid traversing said apertured intermediate portion, means securing said members in axial alignment to engage the end face portions thereof, one of said end face portions being relieved to provide an annular groove receiving said O-ring seal element for partial compression, by the other end face portion, as determined by the engagement of said end face portions, and a coil compression spring acting between said discharge member and said diaphragm to provide force resiliently biasing said diaphragm to engage said intake member valve seat.

4. A check valve comprising a tubular intake member having an axial bore surrounded by an annular end face portion and an axially opening valve seat located radially inwardly of said portion, a further tubular discharge member having an axial bore aligned with said intake member bore and an annular end face portion in axially opposing relation to the face portion of said intake member, a flexible diaphragm disposed between said members in transverse relation to said bores thereof, said diaphragm comprising an outer compressible O-ring seal element disposed between said end face portions, a central, imperforate disk-like valve seat element axially aligned with said intake member valve seat and of a size sufficient to seal the latter upon axial engagement therewith, and an intermediate portion integrally connecting said seal and seat elements, said intermediate portion being apertured in the annular zone thereof between said elements, said central element having an integral, hollow rear extension affording a flow passage for fluid traversing said apertured intermediate portion, means securing said members in axial alignment to engage the end face portions thereof, one of said end face portions being relieved to provide an annular groove receiving said O-ring seal element for partial compression, by the other end face portion, as determined by the engagement of said end face portions, said rear extension of said central disk-like diaphragm seat element being shaped to provide a spring abutment seat facing away from said intake member, and a coil compression spring acting between said discharge member and said abutment seat to provide force resiliently biasing said diaphragm to engage said intake member valve seat.

5. A check valve comprising a tubular intake member having an axial bore surrounded by an annular end face portion and an axially opening valve seat located radially inwardly of said portion, a further tubular discharge member having an axial bore aligned with said intake member bore and an annular end face portion in axially opposing relation to the face portion of said intake member, a flexible diaphragm disposed between said members in transverse relation to said bores thereof, said diaphragm comprising an outer compressible O-ring seal element disposed between said end face portions, a central, imperforate disk-like valve seat element axially aligned with said intake member valve seat and of a size sufficient to seal the latter upon axial engagement therewith, and an intermediate portion integrally connecting said seal and seat elements, said intermediate portion being apertured in the annular zone thereof between said elements, said central element having an integral, hollow rear extension affording a flow passage for fluid traversing said apertured intermediate portion, means securing said members in axial alignment to engage the end face portions thereof, one of said end face portions being relieved to provide an annular groove receiving said O-ring seal element for partial compression, by the other end face portion, as determined by the engagement of said end face portions, said rear extension of said central disk-like diaphragm seat element being of substantial axial thickness as compared with the remainder of the diaphragm and being shaped to provide a spring abutment seat facing away from said intake member, and a coil compression spring acting between said discharge member and said abutment seat to provide force resiliently biasing said diaphragm to engage said intake member valve seat.

6. As an article of manufacture, a one piece check valve diaphragm of resilient material comprising an outer annular sealing ring portion in the form of a bead of substantial axial thickness, a concentric central valve seat engaging portion of disk-like shape and of substantial axial thickness, said central portion having an integral hollow spring receiving, fluid passage extension projecting rearwardly away from a forward, seat engaging surface thereof, and an intermediate, relatively thin portion integrally connecting said portions, and perforated between its zones of connection thereto.

7. As an article of manufacture, a one piece check valve diaphragm of resilient material comprising an outer annular sealing ring portion in the form of a bead of substantial axial thickness, a concentric central valve seat engaging portion of disk-like shape and of substantial axial thickness, and an intermediate, relatively thin portion integrally connecting said portions, and perforated between its zones of connection thereto, said central seat engaging portion being provided with an integral, hollow, passage forming rearwardly projecting member which is relieved to provide an annular, coil spring receiving abutment seat facing axially away from said intermediate portion.

8. As an article of manufacture, a one piece check valve diaphragm of resilient material comprising an outer annular clamping portion, a concentric central valve seat engaging portion of disk-like shape, and an intermediate portion integrally connecting said portions, said central seat engaging portion being provided with an annular, coil spring receiving abutment seat facing axially away from said central portion, said seat being internally spanned by a connecting web having a surface thereof substantially flush with said seat, said central portion having a radial passage therethrough along a side and rearwardly of said web.

9. As an article of manufacture, a one piece check valve diaphragm of resilient material comprising an outer annular clamping portion, a concentric central valve seat engaging portion of disk-like shape, and an intermediate portion integrally connecting said portions and perforated between its zones of connection thereto, said central seat engaging portion being provided with an annular, coil spring receiving abutment seat facing axially away from said central portion, said seat being internally spanned by a connecting web having a surface thereof substantially flush with said seat, said central portion having a radial passage therethrough along a side and rearwardly of said web.

10. As an article of manufacture, a one piece check valve diaphragm of resilient material comprising an outer annular sealing ring portion in the form of a bead of substantial axial thickness, a concentric central valve seat engaging portion of disk-like shape and of substantial axial thickness, said central portion having an integral hollow, passage-forming extension projecting rearwardly away from a forward, seat engaging surface thereof, which extension is provided with an annular spring centering shoulder, a web radially supporting said shoulder and an intermediate relatively thin portion integrally connecting said portions being perforated between its zones of connection thereto.

11. As an article of manufacture, a one-piece check valve diaphragm of resilient material comprising an outer annular sealing portion, a concentric central valve seat engaging portion of disk-like shape, and an intermediate relatively thin portion integrally connecting said portions and perforated between its zones of connection thereto, said central valve seat engaging portion having an interrupted annular portion extending rearwardly thereof and being relieved to provide a coil spring receiving abutment seat therein, said annular portion being internally spanned by a connecting web and having a radial passage therethrough along a side and rearwardly of said web.

12. As an article of manufacture, a one-piece check valve diaphragm of resilient material comprising an outer annular sealing portion, a concentric central valve seat engaging portion of disk-like shape, and an intermediate relatively thin portion integrally connecting said portions and perforated between its zones of connection thereto, said central valve seat engaging portion having an interrupted annular portion extending rearwardly thereof and being relieved to provide a coil spring receiving abutment seat therein, said annular portion being internally spanned by a connecting web extending rearwardly of said valve seat to said spring seat and having a radial passage therethrough along a side and rearwardly of said web.

13. As an article of manufacture, a one-piece check valve diaphragm of resilient material comprising an outer annular clamping portion, a central valve seat engaging portion of disk-like shape, and an intermediate portion integrally connecting said portions and perforated between its zones of connection thereto, said central seat engaging portion being provided with an annular coil spring receiving abutment seat portion facing axially away from said central valve seat engaging portion, said annular spring seat portion being internally spanned by a connecting web adapted to provide said central portion with a radial passage along a side and rearwardly thereof.

References Cited in the file of this patent

UNITED STATES PATENTS

| | | |
|---|---|---|
| 208,379 | Downey | Sept. 24, 1878 |
| 646,902 | Haeberle | Apr. 3, 1900 |
| 785,116 | Perry | Mar. 21, 1905 |
| 790,961 | Holtzman | May 30, 1905 |
| 1,976,851 | Landis | Oct. 16, 1934 |
| 2,006,319 | Hueber | June 25, 1935 |
| 2,223,944 | Roy | Dec. 3, 1940 |
| 2,261,648 | Goldstein | Nov. 4, 1941 |
| 2,370,451 | Dank | Feb. 27, 1945 |
| 2,497,906 | Peters | Feb. 21, 1950 |

FOREIGN PATENTS

| | | |
|---|---|---|
| 35,221 | Sweden | of 1911 |
| 429,244 | France | 1911 |
| 254,125 | Switzerland | 1948 |

UNITED STATES PATENT OFFICE

CERTIFICATE OF CORRECTION

Patent No. 2,758,609 August 14, 1956

Robert S. Dickert et al.

It is hereby certified that error appears in the printed specification of the above numbered patent requiring correction and that the said Letters Patent should read as corrected below.

Column 8, list of references cited, under the heading "UNITED STATES PATENTS" add the following:

2,462,189    Hess--------------Feb. 22, 1949

Signed and sealed this 2nd day of October 1956.

(SEAL)
Attest:
KARL H. AXLINE

Attesting Officer

ROBERT C. WATSON
Commissioner of Patents